June 6, 1967 C. H. ALFORD 3,324,308

TUNNEL DIODE INVERTER CIRCUIT

Filed Feb. 16, 1961 2 Sheets-Sheet 1

*INVENTOR.*
CHARLES H. ALFORD
*BY*
George C. Sullivan
Agent

INVENTOR.
CHARLES H. ALFORD
BY George C. Sullivan
Agent 3,324,308
TUNNEL DIODE INVERTER CIRCUIT Charles H. Alford, Santa Clara, Calif., assignor to Lockheed Aircraft Corporation, Burbank, Calif.

Filed Feb. 16, 1961, Ser. No. 89,884
3 Claims. (Cl. 307—88.5)

This invention relates generally to tunnel diode high-speed logical circuits, and more particularly to a simple tunnel diode inverter circuit capable of performing the NOT operation.

It has been discovered in the art that tunnel diodes, also known as Esaki diodes, are well suited as elements for logical circuits because of their extremely high frequency response, small size, high stability, and relatively low power consumption. A recent article on this subject is "Esaki Diode High-Speed Logical Circuits" by Y. Matsuoka et al., IRE Transactions on Electronic Computers, vol. EC–9, March 1960, pages 25–29. As disclosed in the aforementioned article, these tunnel diodes have found particularly advantageous use when connected to form a basic "twin" which comprises two substantially equal tunnel diodes connected in series.

While these tunnel diode twins have proved highly useful for performing logical operations, considerable difficulty has been encountered in adapting the basic tunnel diode twin to perform the NOT operation. This difficulty is discussed in the first column of page 27 of the aforementioned article.

As is well known in the art, a NOT circuit is one which changes a binary digit "1" into a "0" into a "1." Consequently, if a positive D-C voltage represents a "1" and a negative voltage represents a "0," then the NOT circuit must provide an inversion of the polarity between input and output D-C signals. Such an inversion of polarity has not heretofore been performable using the basic tunnel diode twin circuit described in the aforementioned article. Also, because D-C voltages are employed, a transformer can not be used for inversion. Of course, vacuum tube or transistor amplifiers could be used to provide the inversion required for NOT operation, but these amplifiers not only increase the complexity of the simple tunnel diode twin circuit, but also, cause serious signal delay which detracts from the high-speed performance characteristics of which the tunnel diode is capable.

Using a plurality of tunnel diode twins, it has been found possible to perform the NOT operation without introducing significant delays as disclosed in the aforementioned article, but to do so requires a rather elaborate arrangement referred to as a symmetric or push-pull system. It will be appreciated that the complexity of an elaborate system of this type is a most severe limitation on its use.

Accordingly, it is an object of the present invention to provide a simple tunnel diode inverter circuit which is capable of performing the NOT operation at very high speeds using only a single tunnel diode twin circuit.

Another object of this invention is to provide a simple tunnel diode twin circuit which is capable of performing the NOT operation at very high speeds, which does not require a D-C component in the supply voltages, and which performs two logical operations for each cycle of the supply voltages.

A further object of this invention is to provide a tunnel diode twin circuit which is capable of performing the NOT operation and which can readily be interconnected with other tunnel diode twin circuits for performing a wide variety of logical operations.

Still another object of this invention is to provide a four-diode twin circuit capable of being operated with a simplified power supply.

In accordance with a typical embodiment of the invention the basic tunnel diode twin is provided with a balanced feed arrangement so that a D-C input voltage of either polarity applied to the circuit produces a voltage of opposite polarity at the circuit output. In an extended embodiment of the invention, an additional oppositely poled tunnel diode is provided in series with each tunnel diode of the twin to produce a four-diode twin circuit which may be energized by power supply voltages having no D-C component and which is capable of performing two logical operations for each cycle of the supply voltages.

The specific nature of the invention as well as other objects, uses and advantages thereof, will clearly appear from the following description and the accompanying drawing in which.

In order to provide background and a clearer understanding of the present invention the characteristics of a tunnel diode and the operation of a basic tunnel diode twin will first be considered.

Figure 1:
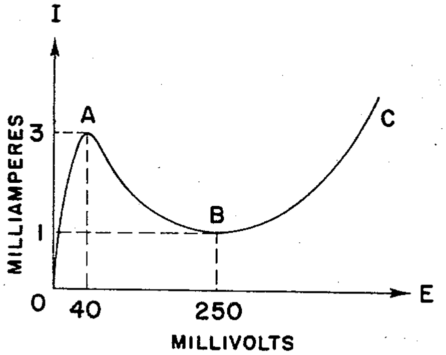
FIG. 1 is a graph showing a typical characteristic of a silicon tunnel diode.

FIG. 1 is a graph showing a typical silicon tunnel diode characteristic. From this graph it can be seen that in the region between O and A, and B and C the tunnel diode has the usual positive resistance characteristic. However, in the region between A and B the tunnel diode has a negative resistance characteristic which is the basis of the operation of the basic tunnel diode twin shown in FIG. 2. In the backward direction, a tunnel diode exhibits no negative resistance characteristic and acts pretty much as a low value resistance of the order of 10 ohms which remains constant throughout a wide back current range.

Figure 3:
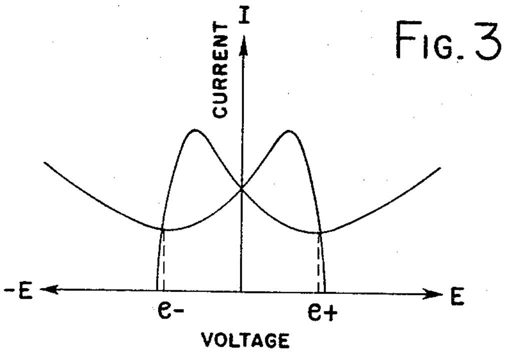
FIG. 3 is a graph showing typical response curves of the twin of FIG. 2.
Figure 2:
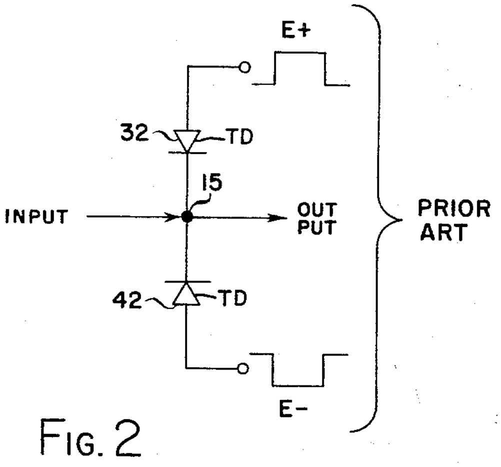
FIG. 2 is an electrical circuit diagram illustrating a basic tunnel diode twin of the prior art.

In FIG. 2 the basic twin comprises two tunnel diodes 32 and 42 having substantially equal characteristics connected in series and poled in the same direction. This twin may have three possible operating points depending upon the magnitude of the equal and opposite exciting voltages B+ and E— applied thereto. If the exciting voltages are small so that operation of each diode is in the region between O and A of the characteristic curve of FIG. 1, then the voltage across each diode will be substantially equal and the output voltage appearing at the junction 15 of the tunnel diodes 32 and 42 will be substantially zero. Likewise, when the exciting voltages E+ and E— are sufficiently large so that both diodes operate in the region between B and C of the characteristic curve of FIG. 1, both diodes will have an equal voltage drop thereacross so that the voltage at the junction is again zero. However, if the exciting voltages E+ and E— are chosen so that the diodes 32 and 42 are driven to their negative resistance region as indicated between A and B of the characteristic curve of FIG. 1, the circuit will then become unstable and the voltage at the output must then stabilize at either of two stable values $e+$ or $e-$ as shown in the graph of FIG. 3, which is formed by superimposing the characteristic curves of the diodes 32 and 42.

The particular stable state, either $e+$ or $e-$, which appears at the output of the twin may be determined by the introduction of a small positive or negative input signal to the twin in an appropriate manner, such as indicated in FIG. 2 where the input signal is applied to the junction 15 between the tunnel diodes 32 and 42. If the input signal is positive it will be understood that the twin will end up in a stable state in which the output voltage is positive (that is, $e+$), and if the input signal is negative the twin will come to a stable state in which the output voltage is negative (that is, $e-$).

A binary system can thus be represented by the input and output signals of such a twin circuit, a positive signal representing a "1" and a negative signal representing a "0." Consequently, if a positive signal is applied to the circuit corresponding to a "1," a "1" output will be obtained and if a negative signal corresponding to a "0" is applied a "0" output is obtained. Such a basic twin circuit, therefore, is capable of conveniently performing the AND and OR operations.

The above described operation of the tunnel diode and the basic tunnel diode twin are well known in the art and are more fully explained in the aforementioned article along with typical logical circuits which may be constructed from various numbers of such twins.

As indicated on page 27, column 1, of the aforementioned article, the basic twin has not been considered as being readily adaptable to perform the NOT operation. Contrary to past thinking in this regard, I have devised a simple tunnel diode inverter circuit incorporating a single basic twin which is capable of performing the NOT operation at very high speeds.

Figure 4:
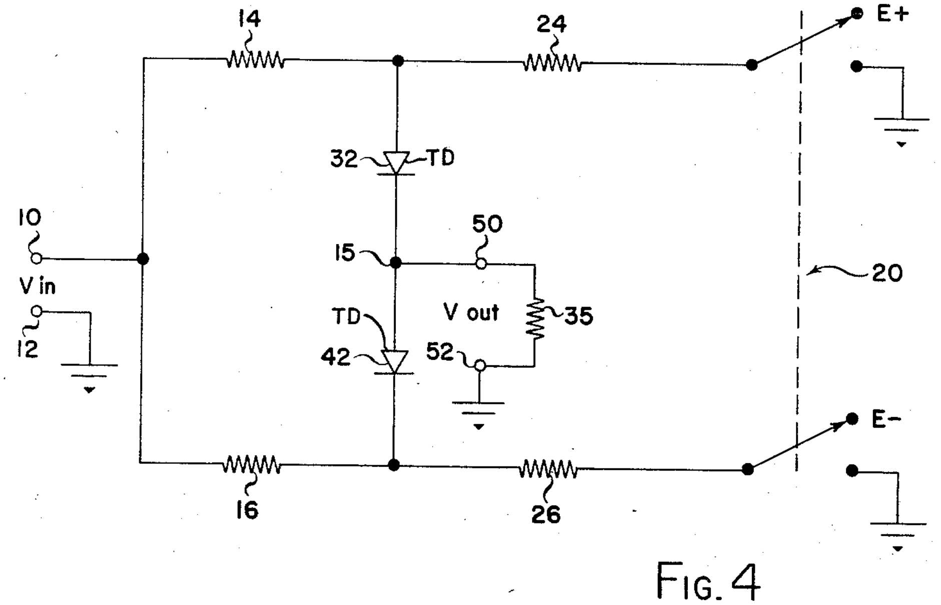
FIG. 4 is an electrical circuit diagram of an embodiment of a tunnel diode inverter circuit in accordance with the invention.

FIG. 4 shows an embodiment of the tunnel diode inverter circuit of the present invention which employs the basic tunnel diode twin comprising the matched diodes 32 and 42 connected in series and poled in the same direction. A D-C input voltage $V_{in}$ is applied to the input terminals 10 and 12 of the circuit as shown. The input terminal 12 is connected to circuit ground while the input terminal 10 is connected to the plate of the diode 32 through a resistor 14 and to the cathode of the diode 42 through a resistor 16. The resistors 14 and 16 are preferably chosen to have substantially the same value. The junction point 15 between the diodes 32 and 42 is connected to an output terminal 50 while a terminal 52 forms the other output terminal and is connected to circuit ground. The output voltage $V_{out}$ of the circuit appears across the output terminals 50 and 52 as shown. A resistor 35 connected across the output terminals 50 and 52 represents a load resistor of another circuit to which the circuit of FIG. 4 may be coupled.

A double-pole, double-throw switch 20, which is preferably electronic, alternately switches exciting voltages E+ and E− and circuit ground to the diodes 32 and 42, respectively, through resistors 24 and 26 as shown. Like the resistors 14 and 16, the resistors 24 and 26 are preferably chosen substantially equal and should have a much smaller value than resistors 14 and 16 so that the input voltage $V_{in}$ need only furnish a small control current while the exciting voltages E+ and E− furnish the bulk of the power required for circuit operation. The positive and negative voltages E+ and E−, respectively, are chosen of substantially equal value with a magnitude sufficient to switch each of the diodes 32 and 42 to its negative resistance region as shown by the region between A and B in FIG. 1. It should be noted that instead of alternating the exciting voltages E+ and E− with circuit ground as shown in FIG. 4, any voltage could be substituted for circuit ground as long as it is not one which would switch its respective diode into the negative resistance region.

The operation of the circuit of FIG. 4 will now be considered in detail as follows. First, assuming that the input voltage $V_{in}$ is absent or zero, it will be understood that the twin comprising the diodes 32 and 42 will operate essentially as described in connection with the basic twin of FIG. 2. That is, when the switch 20 is in the position such that either zero voltage or a voltage within the region OA of the curve of FIG. 1 is applied to the diodes 32 and 42, the voltages across the two diodes will be substantially equal and zero volts will appear at the output between terminals 50 and 52. When the exciting voltages E+ and E− are switched into the circuit, both diodes will tend to be driven to their negative resistance region AB so that either one of two stable states will appear causing the output to be either positive corresponding to $e+$ in FIG. 3 or negative corresponding to $e-$ in FIG. 3 as described previously in connection with the basic twin of FIG. 2. Also, as in the basc twin of FIG. 2, the particular state which will prevail in the FIG. 4 circuit is determined by the polarity of the input signal. However, as will now be explained, in the FIG. 4 circuit the input signal is applied in a manner which achieves an inverted output voltage instead of an output voltage of the same polarity as in the basic twin of FIG. 2.

In the circuit of FIG. 4, it will be seen that instead of applying the input signal to the junction 15 between the diodes 32 and 42 as in the prior art twin illustrated in FIG. 2, the input voltage is applied across the diodes 32 and 42 through substantially equal resistors 14 and 16 which are preferably chosen very much larger than the resistors 24 and 26 so that only a relatively small control current from the input voltage $V_{in}$ is necessary. By means of this balanced input connection, it becomes possible to perform the NOT operation using the simple circuit of FIG. 4. This may be seen by first assuming that the input voltage $V_{in}$ is positive with the switch 20 initially in a position such that the resistors 24 and 26 are connected to circuit ground—that is, the exciting voltages are zero. For such a condition, a small positive current from $V_{in}$ flows through the resistor 14, through the diode 32 in the forward direction, and through the load resistor 35. Also, a small positive current flows through the resistor 16, through the diode 42 in the backward direction, and through the load resistor 35. Current flow in the resistors 24 and 26 also resulting from $V_{in}$ is negligible and need not be considered with regard to this description of the operation as will hereinafter become evident.

It will now be understood that the presence of a positive voltage $V_{in}$ at the input terminals 10 and 12 produces a small current in the forward direction flowing through the diode 32 and a small current in the backward direction through the diode 42. This small current flowing in the diode 32 from a positive $V_{in}$ is in the same direction as would occur in the diode 32 when the exciting voltage E+ is applied and will thus aid the exciting current. However, the small current flowing in the diode 42 from a positive $V_{in}$ is in a direction opposite to the current which would be produced by the exciting voltage E− and will thus oppose the exciting current. Consequently, when the switch 20 applies the exciting voltages E+ and E− to the diodes 32 and 42, respectively, as shown in FIG. 4, the diode 32 will build up to a high voltage operating state in the region BC while the diode 42 will build up to a low voltage operating state in the region OA, thereby producing a negative output voltage $V_{out}$ across the terminals 50 and 52 corresponding to $e-$ in FIG. 3. As a result of the operation just described a positive D.-C. input voltage has produced a negative D.-C. output voltage. In a similar manner a negative D.-C. input will produce a positive D.-C. output voltage. In the case of a negative input voltage, small negative currents flow in diodes 32 and 42 which will aid the exciting current from E− in the diode 42 and oppose the exciting current from E+ in the diode 32. Thus the diode 42 builds up to its high voltage state in the region BC while the diode 32 only builds up to its low voltage state in the region OA, thereby producing a positive output voltage $V_{out}$ corresponding to $e+$ in FIG. 3.

If a positive D.-C. input voltage is now considered to represent a "1" and a negative input voltage is considered to represent a "0," then a "1" input produces a "0" output in the circuit of FIG. 4 while a "0" input produces a "1" output. Effectively, therefore, the simple circuit of FIG. 4 performs the NOT operation.

In order to enable one skilled in the art to readily practice the invention embodied in the circuit of FIG. 4, specific values will now be presented for the components shown. It is to be understood, however, that the presentation of these values is merely for illustrative purposes and in no way is to be considered as limiting the scope of the invention, since these values may be varied over wide limits depending upon the applications involved. In the circuit of FIG. 4, the diodes 32 and 42 may be matched GE 1N2939 tunnel diodes, the resistors 14 and 16 may be 1,000 ohms, the resistors 24 and 26 may be 50 ohms, the load resistor 35 may be 300 ohms, and the voltages E+ and E− may be 220 millivolts and −220 millivolts, respectively. An input voltage $V_{in}$ of 180 millivolts of either polarity then produces an output voltage $V_{out}$ across the terminals 50 and 52 of opposite polarity having a magnitude of about 180 millivolts.

Figure 5:
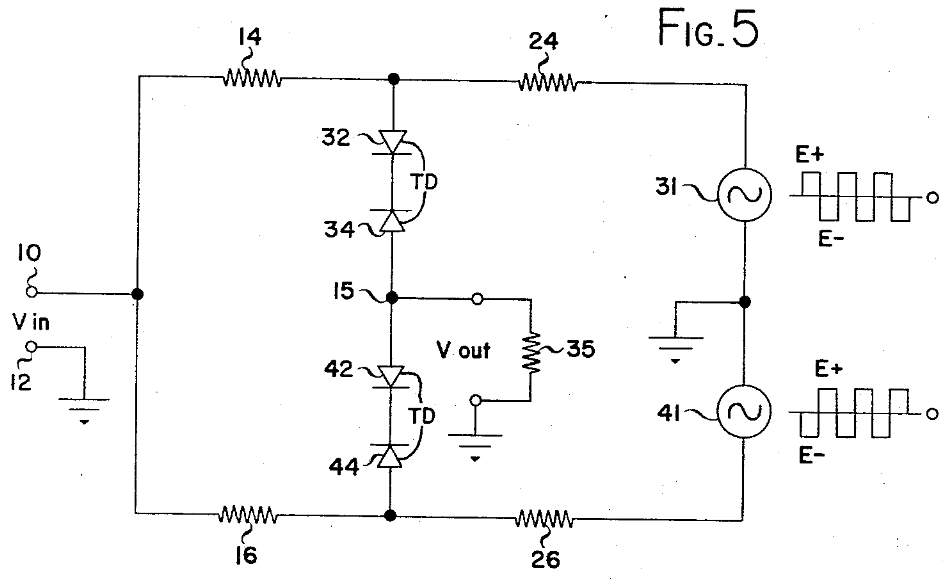
FIG. 5 is an electrical circuit diagram of an extended embodiment of FIG. 4.

FIG. 5 is an extended version of the inverter or NOT circuit of FIG. 4 which makes possible the use of a simpler power supply in that no D.-C. component is necessary for the supply voltages and two logical operations can be performed for each cycle of the supply voltages.

In the circuit of FIG. 5 it will be seen that an additional oppositely poled tunnel diode 34 is provided in series with the tunnel diode 32, while an additional oppositely poled diode 44 is provided in series with the tunnel diode 42. Also, 180° out of phase square wave generators 31 and 41 are substituted for the exciting voltages E+ and E− and the switch 20 of FIG. 4. Like the diodes 32 and 42, the diodes 34 and 44 should be matched so that they have substantially the same characteristics. It is preferable that all the diodes 32, 34, 42 and 44 be matched, but this is not necessary as long as each pair of diodes 32, 42 and 34, 44 are matched to one another.

The operation of the extended embodiment of FIG. 5 may now be explained as follows. First, it will be necessary to remember that in the backward direction a tunnel diode acts pretty much as a low value resistor of the order of 10 ohms. Thus, if it is assumed that the 180° out of phase generators 31 and 41 are in the first half of their cycle having voltages of E+ and E−, respectively, then the additional diodes 34 and 44 will act merely as low value resistors and operation of the circuit of FIG. 5 for this first half cycle will be substantially as described in connection with FIG. 4—that is, an input voltage $V_{in}$ of either polarity will produce an output voltage $V_{out}$ of the opposite polarity.

Similarly, during the second half cycle of the generators 31 and 41 when the voltages provided thereby are E− and E+, respectively, the diodes 32 and 42 will act merely as resistors while the diodes 34 and 44 will serve as the tunnel diodes of the twin to provide circuit operation.

It will thus be seen that the addition of the diodes 34 and 44 in the circuit of FIG. 5 serves two purposes. First, the addition of these diodes permits generators 31 and 41 to be used which require no D.-C. components, since each generator produces a square wave varying between E+ and E−. Secondly, a logical operation is performed for each half-cycle of the driving voltage, or two logical operations for each full cycle as just described. Consequently, the frequency of the driving source in the FIG. 5 circuit need only be one-half of the switching frequency in the FIG. 4 circuit to obtain the same number of logical operations per unit time. As was done for the FIG. 4 circuit, specific values will now be presented for the circuit of FIG. 5. It should be understood, however, that these specific values are merely illustrative as are the values given for the circuit of FIG. 4 and in no way are to be considered as limiting the scope of this invention, since these values are only representative of a wide number of possibilities which may be satisfactorily employed.

In the FIG. 5 circuit, the diodes 32, 34, 42 and 44 are all matched GE 1N2939 tunnel diodes, the resistors 14 and 16 may be 1500 ohms, the resistors 24 and 26 may be 30 ohms, the load 35 may be 300 ohms and the peak-to-peak square wave voltages E+ and E− produced by the square wave generators 31 and 41 may be +250 millivolts and −250 millivolts, respectively. Then, as in the circuit of FIG. 4 an input $V_{in}$ of 180 millivolts of either sign produces an output voltage of opposite polarity also having about 180 millivolts, thereby achieving NOT or inverter operation. As in the circuit of FIG. 4, the positive and negative input and output D.-C. signals may represent "1" and "0" binary numbers.

Another advantage of the circuit of FIG. 5 is that instead of using square wave generators for the generators 31 and 41, it is possible to use sinusoidal generators directly or any other suitable type of alternating waveform. In such case, the peak values of the 180° out of phase sinusoidal generators would be chosen such that the peak positive and negative values are sufficient to drive the tunnel diodes into the negative resistance range, but not so large as to drive both the diodes into the positive resistance range BC beyond the negative resistance region. It will be appreciated that the capability of using sinusoidal generators makes possible a great simplification in power supply design.

Figure 6:
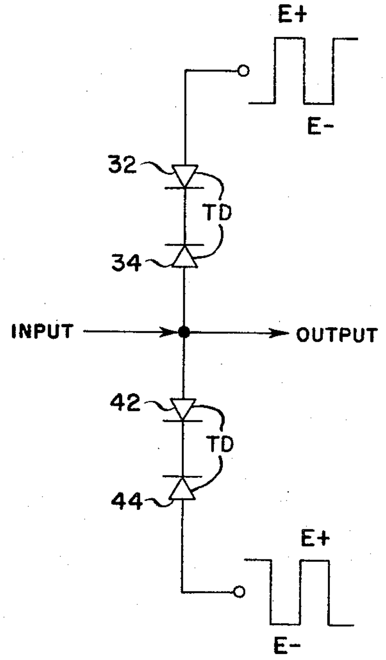
FIG. 6 is an electrical circuit diagram illustrating a four-diode twin in accordance with the invention.

From the above discussion, it will be appreciated that the basic four-diode twin incorporated in FIG. 5 comprising the diodes 32, 34, 42 and 44 may be used in place of the basic twin of FIG. 2 in the previously known applications of the FIG. 2 twin disclosed in the aforementioned article as well as in the NOT circuit of FIG. 5. Such a four-diode twin is illustrated in FIG. 6. By using the four-diode twin of FIG. 6 in place of the basic twin of FIG. 2, the previously mentioned advantages of a simpler power supply are obtained in which the power supply voltages require no D.-C. component and two logical operations are performed for each power supply cycle.

It will be apparent that the specific embodiments of the invention shown and described herein are only exemplary and that many modifications and variations may be made in the construction and arrangement thereof without departing from the scope of the invention as defined in the appended claims.

I claim as my invention:

1. A basic circuit for performing logical operations comprising a first pair of series-connected oppositely-poled tunnel diodes, a second pair of series-connected oppositely-poled tunnel diodes, said first pair being connected in series with said second pair, the like-poled diodes in said first and second pairs being matched, means applying 180° out of phase exciting voltages to said pairs, the positive and negative excursions of said exciting voltages being sufficient to drive the respective diodes of said pairs into their negative resistance region, and means for applying an input voltage to said pairs to determine the stable state of said circuit upon application of said exciting voltages.

2. A tunnel diode inverter circuit comprising a first pair of series-connected oppositely-poled tunnel diodes, a second pair of series-connected oppositely-poled tunnel diodes, said first pair being connected in series with said second pair, the like-poled diodes in said first and second pairs being matched, means applying 180° out of phase exciting voltages to said pairs, the positive and negative excursions of said exciting voltages being sufficient to drive the respective diodes of said pairs into their negative resistance region, and impedance means for feeding an input signal between opposite ends of said pairs and the junction therebetween, said impedance means having characteristics such that the polarity of said input signal determines the stable state of said circuit occurring upon application of said exciting voltages.

3. The invention in accordance with claim 2, wherein said impedance means comprises a first resistor coupled between one side of said input signal and one end of said first and second pairs connected in series, and a second resistor having a value substantially equal to said first resistor coupled between said one side of said input signal and the other end of said first and second pairs connected in series, the other side of said input signal being coupled to the junction between said first and second pairs, said first and second resistors having characteristics such that the polarity of said input signal determines the stable state of said circuit occurring upon application of said exciting signals.

References Cited

UNITED STATES PATENTS 3,097,311 7/1963 Tiemann ----------- 307—88.5

OTHER REFERENCES

Report No. 102, Applications of Tunnel Diodes in Switching Circuits by T. Kunihiro, U. of Ill. Digital Computer Lab., Oct. 26, 1960, pp. 54–57.

ARTHUR GAUSS, *Primary Examiner.*

HERMAN KARL SAALBACH, *Examiner.*

D. R. PRESSMAN, J. JORDAN, *Assistant Examiners.*